Nov. 24, 1942.  R. VALVERDE  2,302,924

METHOD AND APPARATUS FOR AUTOMATIC CONTROL

Filed July 17, 1940

ROBERT VALVERDE
INVENTOR

BY J. F. Brandenburg
ATTORNEY

Patented Nov. 24, 1942

2,302,924

UNITED STATES PATENT OFFICE 2,302,924

METHOD AND APPARATUS FOR AUTOMATIC CONTROL

Robert Valverde, New York, N. Y.

Application July 17, 1940, Serial No. 345,919

12 Claims. (Cl. 236—68)

This invention relates to method and apparatus for automatic control, and more particularly to the automatic correction of a failure of a primary automatic control.

For many purposes apparatus is used to control conditions, such as heat, pressure, or humidity, within a limited range. Even where a constant condition is desirable there must be some variation because a certain differential is required for operating the control apparatus.

It is an object of this invention to provide improved automatic control apparatus which normally operates within selected limits but which definitely limits the differential to a safe range even though the apparatus fails to function at its normal limit. This object is attained by combining with an automatic control device a second automatic control that is subject to the same condition as the first control but operable at a higher limit to influence the first automatic control to operate.

In accordance with one feature of the invention, the second or sentinel control apparatus, after influencing the first or primary control to operate, returns to its original position and does not operate again unless the primary control again fails to function within the limits imposed by the sentinel control.

Another object of the invention is to provide an improved method for limiting the variation in conditions that are subject to automatic control, and still another object is to provide an improved method for automatically correcting a condition caused by failure of an automatic control device to function in the manner intended.

The invention is particularly useful with thermostat controls. The gradual closing or faulty closing of the contacts of a thermostat is accompanied by considerable heat as the resistance between the contacts drops from that of the initial air gap to substantially zero. Occasionally the contacts will weld together, such result depending upon atomic fouling and the intensity of the inrush current. The welding of the contacts, even though slight, retards subsequent opening of the contacts. The thermostat does not have sufficient strength, at its intended operating temperature, to overcome the "sticking" of the contacts.

Although the invention is not limited to thermostats, it will be described as applied to thermostat control apparatus, and it may be said to be an object of the invention to provide an improved thermostat with automatic means for causing sticking contacts to separate or "clear." The automatic means are combined with the operating element of the thermostat to produce a self-clearing thermostat. The preferred embodiment of the invention provides a heater that supplies auxiliary heat to the thermal-responsive element of the thermostat to increase the force of that element when the thermostat fails to open in response to a given temperature of its surrounding air, or other medium. The operation of the heater is controlled by a sentinel thermostat that is set to operate at a temperature somewhat higher than the control thermostat. Should sticking of the control thermostat contacts occur, the overheating that results from the failure of the control thermostat to open causes the sentinel thermostat to operate and supply auxiliary heat sufficient to force the control thermostat to open.

In accordance with one feature of the invention, the sentinel thermostat, when closed, establishes a shunt circuit around the heater which is in series with the switch contacts of the first thermostat. Opening of the contacts of the sentinel thermostat when the control thermostat is closed causes the heater to operate, but opening of the control thermostat at any time breaks the circuit to the heater.

The invention can be constructed with the circuits of the control apparatus capable of carrying the full load current and the thermostats in series with each other and with the load. The contacts of the sentinel thermostat provide a switch in parallel with the heater. Opening of the sentinel thermostat contacts puts the load current through the heater, which puts a stress on the control thermostat. The resulting tension breaks the welded contacts apart and opens the load circuit. The sentinel thermostat closes first while the circuit is still open at the control thermostat and there is, therefore, no danger that the contacts of the sentinel thermostat will stick, since they close with no load.

One important advantage of the invention is that the correction of the failure of the primary control is made automatically and the control apparatus then returns automatically to normal operation without interfering with the processes or conditions that the apparatus regulates.

Other objects, features and advantages of the invention will appear or be pointed out as the specification proceeds.

In the acompanying drawing, forming a part hereof:

Figure 1:
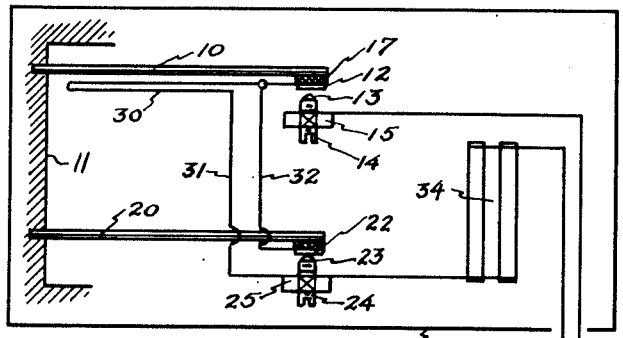
Fig. 1 is a diagrammatic view of control apparatus embodying the invention.

The primary control device comprises a thermostat that has a heat-responsive element 10, preferably a bimetal strip, supported from a holder 11. The control thermostat has a switch comprising a movable contact 12, carried by the bimetal strip 10, and fixed contact 13 at the end of an adjusting screw 14 that threads through a support 15 and can be screwed in or out to change the temperature at which the thermostat operates.

The movable contact 12 is electrically insulated from the strip 10 by insulation 17 that is attached to the strip 10. The movable contact 12 is fastened to the under side of the insulation 17.

The secondary control device comprises a sentinel thermostat with a bimetal strip 20 supported from the holder 11. The switch of the sentinel thermostat includes a movable contact 22 and a fixed contact 23 at the end of an adjusting screw 24 threaded through a support 25. The contact 22 is fastened to insulation 27 that is attached to the strip 20.

A heater consisting of a length of resistance wire 30 extends along the length of the strip 10. This wire is connected at one end to the movable contact 12. The heater is located close enough to the strip 10 to heat it quickly and effectively, but the wire 30 is preferably not in actual contact with the surface of the bimetal. The other end of the heater wire 30 is connected with the support 25 by a conductor 31.

A conductor 32 between the movable contacts 12 and 22 of the respective thermostats provides a parallel of shunt path that short-circuits the heated 30 when the sentinel thermostat is closed.

A load comprising heaters 34 for heating a room, incubator, or other space 35 in which the control apparatus of the invention is enclosed, is connected at one side to the support 25 and at the other side to a power line 36. The support 15 of the control thermostat is connected to the other side of the power line 36.

When the switches of both thermostats are closed, a circuit is completed from the power line 36 through support 15, screw 14, contacts 13 and 12, conductor 32, contacts 22 and 23 of the sentinel thermostat, screw 24, support 25, load 34, and back to the power line 36. The heater 30 is in parallel with the conductor 32 but of considerably higher resistance so that very little current flows through the heater.

When the space 35 in which the thermostats are enclosed becomes heated by the lamp heaters 34 up to a given temperature for which the control thermostat is set, the bimetal strip 10 moves the contact 12 away from the contact 13 and opens the circuit. After the space has cooled to a limited degree, the bimetal strip 10 moves the contact 12 back into contact with the contact 13, the circuit is again closed and the cycle of operation repeated. The temperature in the space is thereby maintained within a reasonably narrow range.

The sentinel thermostat is adjusted to open at a higher temperature than that at which the control thermostat opens, but this higher temperature is not objectionably high for the use to which the heated space is intended (at least not objectionably high when of short duration and occurring only occasionally). If the heated space is under the covers of a bed cradle, a four-degree difference in operating temperatures for the two thermostats can be used, but this example is illustrative only.

If the contacts 12 and 13 stick so that the control thermostat does not open at its normal operating temperature, the space 35 heated by the lamps 34 continues to rise in temperature until the sentinel thermostat opens. The circuit through contacts 22 and 23 and the conductor 32 is broken but the parallel circuit through the heater 30 and the conductor 31 remains closed. This shunting of the load current through the heater 30 causes the heater to raise the temperature of the bimetal strip 10 until the tension breaks the weld between the contacts 12 and 13 of the control thermostat.

The bimetal strips 10 and 20 cool together. The sentinel thermostat closes first with no current flowing. Further cooling causes the control thermostat to close and again complete the circuit.

Heater 30 is a short piece of low ohmage resistance wire. Its location close to the bimetal strip 10 causes the load current to quickly heat the bimetal through the few degrees sufficient to break the weld. The resistance of this shunt heater 30 is a very small percent. of the load. Hence sentinel contacts 22, 23, open at practically no load. This is verified by the brightness of contacts 22, 23 after months of use. Since sentinel contacts 22, 23 normally close at no load, sticking cannot occur.

An interference to the normal cycle may occur if the thermostats are jarred, causing both to open momentarily. Under the worst condition the jarring may cause contacts 22, 23 to open and close at the instant when contacts 12, 13 are closed, that is when load current is flowing. This percentage of load current increase on the closing of contacts 22, 23 is so small under this accidental condition that it has been found negligible.

Figure 2:
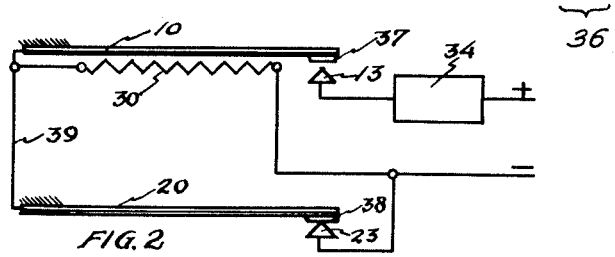
Figs. 2–4 are diagrammatic views showing modifications of the invention illustrated in Fig. 1.

Fig. 2 shows a modified form of the invention. Movable contacts 37 and 38 are attached directly to the bimetal strips 10 and 20, respectively, and these strips serve as conductors of the circuit. If the holder that supports the strips 10 and 20 is not a conductor, the circuit between the strips is completed by a jumper 39 which serves the same purpose as the conductor 32 of Fig. 1.

Figure 3:
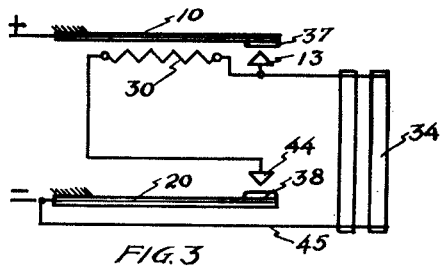

Fig. 3 shows a modification in which the heater 30 is connected at one side to the fixed contact 13 and at the other side to a fixed contact 44 that is located above the bimetal strip 20 instead of below it as in Figs. 1 and 2. The heating of the bimetal strip 20 closes a circuit, therefore, instead of opening one as in Figs. 1 and 2.

When the temperature is low enough for the bimetal strip 10 to hold the contact 37 against the fixed contact 13 there is a closed circuit through the bimetal strip 10, which is connected to one side of the power line, and through the contacts 37 and 13 to the load 34 which is connected to the other side of the power line by a conductor 45. There is no circuit through the heater 30 because the contacts 38 and 44 are not touching one another.

In the normal operating cycle of the control apparatus of Fig. 3 the load circuit is made and broken as required by the opening and closing of the thermostat switch comprising the contacts 37 and 13. The switch of the sentinel thermostat remains open.

If the contacts 13 and 37 stick, however, and the lamps 34 heat the space in which the thermostats are enclosed above the temperature at which the sentinel thermostat operates, the contacts 38 and 44 are brought into contact and a circuit is closed from the bimetal strip 10 through contacts 37 and 13, heater 30, conductor 31, and contacts 44 and 38, to the bimetal strip 20. The closing of this circuit in parallel with the load operates the heater 30, and the heating of the bimetal 10 forces the contacts 13 and 37 apart and breaks the circuit to both the heater 30 and load 34. Here heater 30 is of high resistance to take the line voltage at a very small current to give the same heating as used in Figs. 1 and 2 thermal control.

Figure 4:
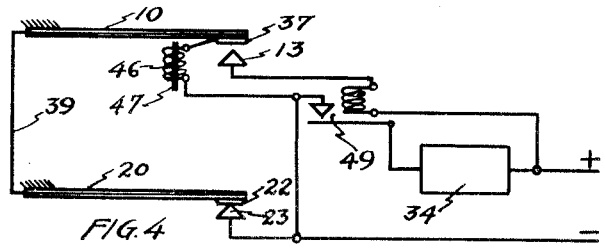

The modified form of the invention shown in Fig. 4 is the same as the structure shown in Fig. 2 except that the control apparatus handles a relay current instead of the full load current, and a solenoid 46 is used in place of the heater 30. The solenoid has a plunger 47 that is not affected by the minute current that flows while the shunt circuit around the solenoid 46 is closed, but when the contacts 22 and 23 move apart, the flow of current through the solenoid 46 causes the plunger 47 to move up and strike the bimetal strip 10 with sufficient force to break the weld that causes the contact 37 to stick to the fixed contact 13.

Solenoids can be substituted for the heaters in any of the circuits shown in the drawing, or still other means can be used for applying an abnormal force or influence to the control thermostat to break the contacts loose whenever they stick and prevent the circuit from being opened at the normal operating temperature of the control thermostat.

In the apparatus shown in Fig. 4 the load current does not pass through the thermostats. The load circuit is opened and closed by a relay 49, and the operation of the relay is controlled by the thermostats. The circuit of Fig. 4 can be used without the relay 49, and any of the circuits of the other figures can be changed to include such a relay.

Figure 5:
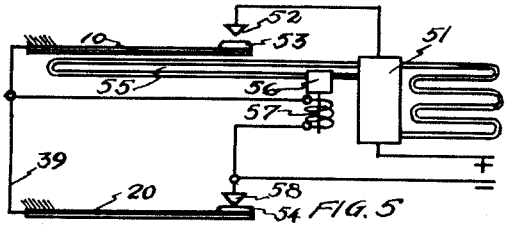
Fig. 5 shows the application of the invention to refrigeration control.

Fig. 5 shows the invention applied to refrigeration control. A refrigerating unit 51 is connected on one side with a power line and on the other side with a fixed contact 52 above the bimetal strip 10. A movable contact 53 is on the top surface of the strip. A jumper 39 connects the strip 10 with the sentinel thermostat bimetal strip 20.

There is a movable contact 54 on the top surface of the bimetal strip 20 in position to cooperate with a fixed contact 58 that connects with the power line to complete the circuit through the refrigeration unit 51. As in the case of the bimetal strips shown in the other figures, the strips 10 and 20 in Fig. 5 bent upward as they become warmer and bend downward as they cool.

When both thermostat switches are closed, the circuit through the refrigeration unit 51 is closed and the unit operates to cool the liquid, air, or other fluid in the space intended to be cooled. When the space has been cooled to a given temperature, the bimetal strip 10 moves the contact 53 away from the fixed contact 52, opens the circuit, and caused the operation of the refrigeration unit 51 to stop.

When the temperature in the space cooled by the refrigeration unit 51 rises again to a degree sufficient to cause the contacts 52 and 53 to come together, the refrigeration unit 51 again comes into operation and the cycle is repeated.

An auxiliary cooling coil 55 is located close to the bimetal strip 10, either above or below it, but a shut-off valve 56 prevents refrigerating medium from flowing in the coil 55 during the normal cycle of operation of the control apparatus.

A solenoid 57 for opening the shut-off valve 56 is connected in the circuit between the strip 10 of the primary control thermostat and the fixed contact 58 of the sentinel thermostat. If the normal cycle of operation is interfered with by a sticking of the contacts 52 and 53, the refrigerating unit 51 continues to operate until the temperature drops low enough to cause the sentinel thermostat to operate and move the contact 54 away from the fixed contact 58.

The opening of the shunt circuit around the solenoid 57 causes the solenoid to be energized so that it opens the shut-off valve 56. Refrigerating medium then flows in the coil 55, and chills the bimetal strip 10 so that the tension is increased and the stuck contacts are pulled apart.

Although Fig. 1 is the only embodiment of the invention shown with the thermostats adjustable to operate at different temperatures, it will be understood that all of the thermostats shown in the other figures can be made adjustable if desired, and that the combination shown in Fig. 1 can be made with non-adjustable thermostats. Terms of orientation are, of course, relative. Various changes and modifications can be made, and some features of the invention can be used without others, without departing from the invention as defined in the claims.

I claim:

1. The method of limiting the variation in conditions that are subject to regulation by an automatic control device, which method comprises artificially increasing the influence that causes operation of the control device when said device fails to operate at a given limit, continuing said artificial increase until the control device does operate, and utilizing such operation of the control device to automatically stop said artificial increase while the condition that the control device is intended to regulate is still beyond said limit.

2. The method of controlling the heating of a space by means of a heat-responsive device that is exposed to the heat of the fluid within said space, which method comprises applying local heat to the heat-responsive device upon any increase in the heat of the fluid within said space above a given limit that is higher than the intended operating temperature of the heat-responsive device, causing the application of such local heat in response to increase in the temperature within said space, and controlling the local heating through the heat-responsive device so that operation of said heat-responsive device causes immediate cessation of the supply of local heat.

3. The method of controlling a circuit with two thermostats by exposing both thermostats to the heat of the fluid within a space to be controlled for temperature with one thermostat set to operate at a higher temperature than the other, directly controlling the circuit by the normal operation of the thermostat that operates at the lower temperature, and controlling an increase in the operating force of that thermostat by means of the other thermostat that operates at the higher temperature, but making said increase in the operating force directly dependent upon the thermostat that operates at the lower temperature so that operation of that thermostat causes immediate cessation of said increase in the operating force.

4. The method of correcting by a secondary control device the failure of a primary control device to control in accordance with a normal cycle, which method comprises maintaining the primary control device in its controlling relation with other apparatus, applying an abnormal influence to said primary control device if it fails in its normal operation, controlling the application of the abnormal influence by means of the secondary control device in response to a change, beyond a given limit, in the condition that causes the normal operation of the primary control device, discontinuing the application of said abnormal influence in direct response to operation of the primary control device, and causing the secondary control device to return to its original position following operation of the primary control device in response to said abnormal influence.

5. Control apparatus including in combination a first control means subject to the influence of the condition which it controls and operable when that condition reaches a given limit, means for correcting a failure of the first control means to operate at said limit, said means for correcting being directly controlled in part by operation of the first control means so that operation of said first control means prevents or immediately discontinues operation of said means for correcting, and a second control means that prevents the correcting means from becoming effective until the first control means has failed to operate at said limit, the second control means being of such a nature that it automatically returns to its original position after each operation that makes the correcting means effective.

6. Apparatus for controlling the supply of electricity to a load, said apparatus including two switches in series with each other and with the load, separate thermal-responsive devices for operating each of the switches at a different temperature, and a heater for supplying additional heat to the thermal-responsive device that is designed to operate at the lower temperature, said heater being in series with the switch of the thermal-responsive device that operates at the lower temperature.

7. A bimetal control thermostat and a similar bimetal sentinel thermostat in series circuit with each other and with a load, a heater on the control thermostat and in series with said control thermostat and with the load, a shunt circuit around the heater, said shunt circuit being in series with the sentinel thermostat so that opening of the sentinel thermostat puts the heater in series with the load.

8. A control apparatus including in combination a control thermostat having a heat-responsive element for operation by heat in the surrounding medium, and a switch operated by said element for controlling apparatus that regulates the temperature of said surrounding medium, a heater in series with said switch and associated with the heat-responsive element in position to produce abnormal heating of said element, a second switch for controlling the operation of the heater, and a sentinel thermostat for operating said second switch.

9. The combination with a control thermostat that opens a switch at a given temperature in response to heating of the surrounding air, of a heater in series with said switch and associated with the thermostat for supplying auxiliary heat to force said thermostat to open in the event that the switch sticks and prevents normal operation of said thermostat, and control means for said heater including a sentinel thermostat adapted to operate at a temperature beyond the normal operating temperature of the control thermostat, said sentinel thermostat being located in position to be subject to the same air temperature influence as the control thermostat.

10. Control apparatus including a control thermostat having a heat-responsive element and a switch, a heater associated with said element, a sentinel thermostat including a switch that is opened by said sentinel thermostat at a temperature higher than that required to operate the control thermostat, a conductor connecting the heater in series with the switch of the control thermostat, and a shunt circuit around the heater for connecting the switches of both thermostats in series with each other, said shunt circuit short-circuiting the heater when the sentinel thermostat switch is closed.

11. Control apparatus including a control thermostat having a heat-responsive element and a switch, a heater associated with said element, a sentinel thermostat including a switch that is opened by said sentinel thermostat at a temperature higher than that required to operate the control thermostat, a conductor connecting the heater in series with the switch of the control thermostat and with a load, and a shunt circuit around the heater for connecting the switches of both thermostats in series with each other and with said load, said shunt circuit short-circuiting the heater when both switches are closed.

12. Control apparatus comprising a primary control thermostat and a sentinel thermostat each of which includes a heat-responsive strip that forms a part of the circuit of the thermostat, an electrical conductor between the two strips connecting said strips in series, a shunt circuit around the sentinel thermostat but in series with the primary control thermostat, and electrically operated apparatus in said shunt circuit for forcing operation of the primary control thermostat.

ROBERT VALVERDE.